(12) United States Patent
Aujay et al.

(10) Patent No.: US 9,874,937 B2
(45) Date of Patent: Jan. 23, 2018

(54) DEVICE FOR GESTURAL CONTROL OF A SYSTEM, AND ASSOCIATED METHOD

(71) Applicant: MOVEA, Grenoble (FR)

(72) Inventors: Guillaume Aujay, Grenoble (FR); Cyrille Soubeyrat, Reaumont (FR)

(73) Assignee: Movea, Grenoble (FR)

( * ) Notice: Subject to any disclaimer, the term of this patent is extended or adjusted under 35 U.S.C. 154(b) by 46 days.

(21) Appl. No.: 14/370,663

(22) PCT Filed: Dec. 19, 2012

(86) PCT No.: PCT/EP2012/076216
§ 371 (c)(1),
(2) Date: Jul. 3, 2014

(87) PCT Pub. No.: WO2013/102563
PCT Pub. Date: Jul. 11, 2013

(65) Prior Publication Data
US 2014/0368429 A1 Dec. 18, 2014

(30) Foreign Application Priority Data
Jun. 1, 2012 (FR) ...................................... 12 50140

(51) Int. Cl.
*G06F 3/01* (2006.01)
*G06F 3/033* (2013.01)
(Continued)

(52) U.S. Cl.
CPC .............. *G06F 3/017* (2013.01); *G06F 3/033* (2013.01); *G06F 3/038* (2013.01); *G06F 3/0346* (2013.01)

(58) Field of Classification Search
CPC .......... G06F 3/017; G06F 3/033; G06F 3/0346
See application file for complete search history.

(56) References Cited

U.S. PATENT DOCUMENTS

| 2005/0212753 A1* | 9/2005 | Marvit | ..................... G06F 3/017 345/156 |
| 2005/0243061 A1* | 11/2005 | Liberty | ................ A61B 5/1101 345/158 |

(Continued)

FOREIGN PATENT DOCUMENTS

| EP | 2343626 | 7/2011 | |
| WO | WO 2011039283 A1 * | 4/2011 | ............. G06F 3/017 |
| WO | 2011/153421 | 12/2011 | |

OTHER PUBLICATIONS

International Search Report and Written Opinion from PCT/EP2012/076216, dated Feb. 1, 2013.

*Primary Examiner* — Lixi C Simpson
(74) *Attorney, Agent, or Firm* — Pierre R. Yanney (57) ABSTRACT

A device (DISP) for gestural control of a system (SYST) includes a grippable mobile control element (TC), a movement sensor assembly (EC) for measuring movements of the mobile control element (TC), and a processing circuit (DET) for detection the rotation or translation of the mobile control element in relation to an axis that is substantially invariant over a time window. The device (DISP) also includes a circuit (REG) for adjusting the value of at least one parameter of the system, and a circuit (CMD) for controlling activation/deactivation of the adjustment upon a detection by the detection circuit (DET) of a rotation and/or translation of the mobile control element in relation to an axis that is substantially invariant over a time window.

23 Claims, 9 Drawing Sheets

(51) Int. Cl.
*G06F 3/038* (2013.01)
*G06F 3/0346* (2013.01)

(56) References Cited

U.S. PATENT DOCUMENTS

| | | | | |
|---|---|---|---|---|
| 2010/0095773 A1* | 4/2010 | Shaw | ............... | G06F 3/0346 |
| | | | | 73/514.31 |
| 2010/0271400 A1* | 10/2010 | Suzuki | ............... | G06F 3/017 |
| | | | | 345/660 |
| 2011/0298700 A1* | 12/2011 | Ito | ............... | G06F 3/0346 |
| | | | | 345/156 |
| 2012/0086725 A1* | 4/2012 | Joseph | ............... | G06F 3/038 |
| | | | | 345/629 |
| 2012/0323521 A1* | 12/2012 | De Foras | ............... | G06F 3/017 |
| | | | | 702/141 |

* cited by examiner

DEVICE FOR GESTURAL CONTROL OF A SYSTEM, AND ASSOCIATED METHOD

CROSS-REFERENCE TO RELATED APPLICATIONS

This application is the National Stage of International Application No. PCT/EP2012/076216, filed on Dec. 19, 2012, which claims the benefit of French Patent Application No. 1250140, filed on Jan. 6, 2012. The contents of all of these applications are incorporated herein by reference.

BACKGROUND

1. Field of the Invention

Various embodiments of the invention relate to devices for gestural control of a system, and to associated methods.

2. Description of the Related Art

In the context of simple commands, such as those applied to televisions, video recorders, multimedia players, or television decoders, remote controls using buttons have come to the fore. The principle generally applied is to associate a function of the remotely controlled system with a button of the remote control. The growing number of functions of the system to be controlled has led to a growth, in the same proportion, to the number of buttons on the remote controls.

Specific screens presenting a visual man machine command interface have made it possible to control this growth. On these screens, the user can move gradually, by successive selections on various options presented on the screen, and validate his choice of command. These interfaces remain unwieldy and complex to use and do not allow intuitive navigation in the system control means as a whole.

In parallel, advanced systems control principles (for example via screens) have been developed and designed over the last thirty years jointly with advances in the possibilities offered by desktop computer mice. The latter make it possible to control a large number of functions of these systems with the aid of a small number of commands.

To achieve this, these desktop computer mice have notably introduced a set of commands controlled by the movement of the mouse on the desktop. This computer mouse movement is notably utilized by the user to control the position of a cursor on the screen which can indicate the state of the system and makes it possible to simply activate contextual functions of this position with the aid of a much reduced number of buttons.

The utilization of the movement of the user, hitherto limited to a context of displacement of a mouse on a table (and consequently in a two-dimensional space), has more recently been widened to a context of free movement in space, by "air mice", thereby making it possible to widen the context of application to situations in which no plane horizontal support is present, also allowing access to movements in relation to the three dimensions in space. The applicational situations thereof are multifold, such as that of a speaker who desires to control a system (notably a piece of software on his computer) without constraint of accessing a plane of support, or else that of a multimedia system user (for example a television viewer or a user who desires to view photos on his television, or to play music, etc.) utilizing a multimedia computing system. In both cases, the user's environment is devoid of plane support which would allow the utilization of a desktop mouse.

In the context of the previously introduced multimedia systems, and until recently, man-system interaction was based on remote controls divested of movement capture functions. As described previously, the remote controls thus designed have ended up being equipped with a large number of buttons, necessary for the control of multimedia systems affording ever more functionalities. The set of commands necessary for the control of a system is large and gives rise to great complexity for the user. The latter must therefore memorize the numerous actions to be carried out to activate each command. He must also frequently verify that the buttons that he activates are those which correspond to the expected action, thereby causing his gaze to go back and forth numerous times between the screen and the remote control.

The decline in the costs of movement sensors has made it possible to introduce commands through movements in space in this application context.

These systems with gestural control in space, i.e. in three dimensions, are intended to significantly improve the ergonomics of the user interface through the use of intuitive gestures while reducing to the minimum the interaction involving conventional commands triggered by buttons.

These devices for gestural control of systems are becoming increasingly commonplace, such as mice or remote controls for games consoles or multimedia systems. They are often used, for example, to control the position of a cursor on the screen, such as disclosed in U.S. Pat. No. 5,440,326 which describes the control of a cursor on the screen on the basis of a gyroscope. Remote controls with measurement of the movement also make it possible to recognize gestures and thus to launch specific actions related to these gestures, or to control continuous levels (such as the intensity of the sound, or the scrolling of a document, the playing speed of a video, etc.). The movement of the user must then be interpreted by various procedures for processing the movement signals corresponding to what is expected, thereby requiring the activation of the appropriate mode at the appropriate moment according to the user's intention: this may entail a mode of control of the position of the cursor by movement, a gesture recognition mode, a mode of control of a continuous level.

Known, for example, is European Patent Application No. EP1985233A1, which pertains to a method for detecting a substantially invariant axis of rotation of a movement of a mobile object equipped with at least one inertial or magnetic sensor with three sensitivity axes.

Currently, passage from one mode to the other requires that the user declares his intention, this being conventionally implemented through the assigning of buttons for each intention on the remote control. Situations therefore persist in which the user must still press buttons, for example to pass from one mode to the other.

SUMMARY OF THE INVENTION

An aim of various embodiments of the invention is to reduce the complexity of the control of the system by proposing commands that are simpler for the user to memorize, more intuitive and ergonomic and further utilizing gesture, thus reducing the number of functions required to be activated by buttons.

Hence, there is proposed, according to one aspect of the invention, a device for gestural control of a system, the device comprising a grippable mobile control element, a movement sensor assembly adapted for measuring the movements of said mobile element, means of detection of a rotation and/or translation of said mobile element in relation to an axis which is substantially invariant over a time window, comprising, furthermore, means of adjustment of the value of at least one parameter of said system, and means of control of activation/deactivation of said adjustment means adapted for activating said adjustment means upon a detection by said means of detection of a rotation and/or translation of said mobile element in relation to an axis which is substantially invariant over a time window.

Such a device makes it possible to facilitate the use of the system by means of gestural control in relation to an axis. Indeed, the device is thus capable of automatically activating a mode of control of the system according to the gestures of the user, without the latter having to indicate his intention other than by a gesture of rotation or translation in relation to an axis.

In one embodiment, the detection means are adapted for detecting a rotation and/or translation of said mobile element in relation to a substantially invariant axis by comparing a parameter representative of the movement of said mobile element with a threshold.

This parameter represents the measurement in which the movement is in relation to a single axis, for example, the larger this parameter, the more the movement is in relation to a single axis. If the parameter is greater than the threshold, the device enters the adjustment mode, and if the parameter is below the threshold, the system enters gesture recognition mode. This threshold can be preadjusted, or perhaps (automatically) adapted to the user.

According to one embodiment, said control means are adapted for activating different means from said adjustment means in the absence of detection by said means of detection of a rotation and/or translation of said mobile element in relation to an axis which is substantially invariant over a time window.

In one embodiment, said means different from said adjustment means comprise gesture recognition means.

Various embodiment devices of the invention are capable of determining the mode in which the user's gestures must be interpreted, without the user having to indicate the desired mode (between adjustment and gesture recognition). For example, the system automatically chooses between a control mode, a mode in which a parameter of the device can be adjusted, or a gesture recognition mode, a mode in which the user's movements are compared with a library of gestures. For example, the user can select the adjustment mode by making a movement (rotation or translation) in relation to a single axis. This signifies that as soon as the device detects that the user makes a gesture on a single axis, the system passes to adjustment mode. For all the other gestures, the system uses the gesture recognition mode. Consequently, it is important to distinguish the gestures in relation to a substantially invariant axis from the other gestures.

According to one embodiment, said detection means are adapted for modifying said threshold after at least one gesture having triggered the means for recognizing gestures, for which the maximum value of said representative parameter is not included in a span of percentages of values of said threshold, typically between 40 and 60% of said threshold.

In one embodiment, said detection means are adapted for modifying said threshold after detection of at least one gesture having activated the adjustment means, the duration of activation of the adjustment means being less than a limit duration.

According to one embodiment, said time window is a sliding window.

Thus the device is, in a continuous manner, in user movement detection mode.

Generally the analysis, conducted over a given time window, of detection of movement of substantially invariant axis can be applied in respect of sliding windows, by simply shifting the time window over which the detection operation is carried out and thus provide a time-continuous detection response.

In one embodiment, said detection means are adapted for determining the presence of a significant movement over said time window on the basis of a calculation of the value of a variable representative of said movement and of a comparison of said value with a threshold.

Significant movement is intended to mean a movement carried out in an intentional manner by the user, which must be manifested by amplitudes sufficiently distinct from the noise in the movement signals measured. The threshold is determined as a function of the quality of the sensors (their noise level) and as a function of the amplitude recorded for gestures considered to be intentional.

Thus various embodiments of the invention make it possible to avoid detecting movements in relation to a substantially invariant axis in an inopportune manner, even though the user has not carried out an intentional movement, thereby avoiding generating inopportune changes of modes of the controlled system.

According to one embodiment, said detection means are adapted for delivering as output values of parameters characterizing said detected axis of rotation and/or translation.

It is thus possible to accurately characterize the detected axis of rotation and/or translation.

For example, said detection means are adapted for using a singular-value decomposition.

Thus, it is possible to characterize an axis according to a proven method, such as illustrated for example in European patent application EP 1985233A1, referencing two works, "Principal Component Analysis by IT Jolliffe" from Springer and "A User's Guide to Principal Components" (Wiley Series in Probability and Statistics) by J. Edward Jackson, making it possible at one and the same time to estimate whether the movement is carried out along a single or substantially constant axis, and to provide values of parameters of the axis thus detected. The detection means are adapted for detecting and characterizing the single axis by implementing an adapted method of the EP patent which applies the procedures for decomposing a matrix formed on the basis of the sensor measurements arising from the analyzed time window into singular values or into eigenvalues and eigenvectors.

This procedure makes it possible at one and the very same time to detect whether a rotation or a translation of substantially single axis has been carried out and to characterize this invariant axis. The detection criterion can be adjusted relative to the power of the noise of the sensors. The detection criterion can also take non-intentional movements into account.

In one embodiment, said control means are adapted for associating the adjustment means with at least one parameter of the system as a function of said values of parameters characterizing said detected axis of rotation and/or translation, and of defined values corresponding to at least one predefined axis of rotation and/or translation.

Thus, it is possible to associate an adjustment of the system as a function of the effecting of a rotation and/or translation movement in relation to a predetermined axis, and to use predefined axes associated respectively with a different adjustment. It is also possible to effect an association between an adjustment of the system and a set of predefined axes or a span of axes through a decision logic implemented in the control means.

According to one embodiment the detection means are, furthermore, configured to deliver as output a value of a parameter representative of an amplitude of the rotation and/or translation movement in relation to the detected axis, and the control means are configured to control an intensity of adjustment on the parameter(s) of the system as a function of said amplitude or said amplitudes detected by said detection means.

It is thus possible to easily control the intensity of the desired adjustment. Of course, the value of the parameter can be provided continuously.

In one embodiment, said movement sensor assembly comprises first means for measuring the angles or angular speeds of rotation in relation to at least two axes.

Thus it is possible to detect automatically, with the aid of the detection means, a rotation movement of the grippable mobile control element carried out in relation to an axis during a chosen time window, and to control a continuous level of the system through rotation movements of the grippable assembly. This rotation sensor principle is moreover very widespread in pointing products such as the Air Mouse or remote controls with measurement of movement since it makes it possible to control in an ergonomic manner the displacement of a cursor on the screen, thereby enabling the invention to be applied without calling into question the sensor devices customarily employed. Typically, in the case of a remote control with measurement of movements, the duration of the time window may be of the order of 100 ms to 500 ms.

According to one embodiment, said movement sensor assembly comprises second means for measuring the linear positions, linear speeds, or linear accelerations in relation to at least two axes.

It is thus possible to detect a translation movement in relation to a substantially invariant axis of the grippable mobile control element.

It is thus possible to detect a movement of substantially invariant axis in terms of both rotation and translation. These two kinds of movement can be utilized to increase the detected number of possible combinations of movements having invariant axes so as to control a large possible number of modes of the system. Moreover, the fact of having several kinds of sensors increases the detection performance by contrasting single-axis detection criteria arising from the various sensors. For example, it is possible to use the measurements of an accelerometric sensor to enhance, or better characterize a detection of single-axis rotation by rotation speed sensors.

Thus, if the detection must respond to a criterion of translation-free single-axis rotation of the grippable device, it will be easy to verify, with the aid of the measurement arising from the accelerometer, that the device has not undergone any acceleration in relation to the detected axis of rotation. False detections are thereby limited.

According to one embodiment, said detection means are adapted for using the absolute values of the data provided by said movement sensor assembly in place of said data.

The use of the absolute values of the data provided by the movement sensor assembly rather than the data provided directly by the movement sensor assembly makes it possible to improve the quality of detection of a rotation in relation to a single axis by limiting the undetected cases. Thus, the user can carry out back-and-forth movements along a single axis, the direction of displacement, back or forth, will not be taken into account for single-axis movement detection. To determine the single axis or to measure the displacements along the single axis, the measurements are taken into account together with their sign, and not the absolute values of these measurements.

In one embodiment, said detection means are adapted for detecting a rotation and/or a translation in relation to an axis which is substantially invariant over said time window on the basis of a calculation of a proportion of the amplitudes of the movements of each axis relative to the amplitude of the overall movement.

These proportions can thus be usefully referred to normalized indicators. Thus, by way of example, in a system with two measurement axes x and y, the proportions of movement in x, which may be denoted px, and in y, which may be denoted py, are formed. Without restricting the generality, it is possible in respect of the quality of the example to refer to normalized proportions between $-1$ and $1$. If one measures a majority proportion of movement along the x axis (i.e. px close to 1) and as a consequence almost zero along the y axis (py close to 0), then the movement is single-axis and can be calculated with the aid of the proportions by: $px*x+py*y \sim =x$ which is detected. If the proportions of movements along x and y are of the same value, then the movement is along the axis $px*x+py*y$ or px and py are equal.

By way of example, or in one embodiment, it will be possible for the above-proposed measurement of the proportions simply to be carried out by taking the ratio of the mean amplitude of the signal arising from each measurement axis to the sum of the absolute values of the means of the amplitudes of the axes.

To perform the operation of detection of movement in relation to a predetermined axis, it is then easy to ascertain the values of the proportions corresponding to this predetermined axis and therefore to test whether the proportions calculated on the basis of the movement signals are close to the expected values. Example: $px=1$, $py=0$ corresponds to a single-axis movement along the axis x.

In practice, it will be possible to test for example that the calculated proportions belong to an interval whose center is equal to the expected value (in the example $px=1$, $py=0$) and whose width is dependent on the tolerance of the detector and the noise in the signals.

It is possible to use any other mode of calculation instead of the mean value which will make it possible to yield the value of principal trend or of the signal measured in relation to each axis of the sensor assembly over the analysis time window. For example, by means of a median, weighted averages, or low-pass filter or any other similar procedure.

In one embodiment, said detection means are adapted for detecting a rotation and/or a translation in relation to a substantially invariant axis on the basis of an average and/or of a median in relation to each axis of the sensor assembly, and of a comparison of a function of said average and/or median with an interval of values.

The function of said averages is for example a weighting by the sum of the absolute values of said averages so as to establish an indicator of the proportions of the movement in relation to each relative to the overall movement.

The center of the interval of values used for the comparison is determined according to the datum of the axis of the movement that it is sought to detect. The width of the interval is adjusted through the tolerance that is adopted with regard to single-axis detection.

For example, said detection means, adapted for determining a rotation and/or a translation of said sensor assembly in relation to a single axis which is substantially invariant over said time window, are adapted for:

calculating, over said time window, an average and/or median and/or a low-pass filtering, in relation to each axis, of the angular speeds of rotation and/or linear speeds;

calculating, over said window, the sum of the absolute values of the axial averages;

calculating the proportions by the ratio between the axial averages and said sum of the absolute values of the axial averages; and delivering as output of tests, the value 1 if all said tests are positive, and the value 0 otherwise.

This affords a fairly non-complex means, implementing a reduced number of calculations for establishing the detection of a movement of predetermined substantially invariant axis, suitable for limited computers.

Furthermore, it is possible to test whether each axial average is greater than an axial minimum threshold, and whether each axial average belongs to a value interval dependent on the detected axis.

It is thus validated that a significant movement has been carried out to enhance the detection of movement in relation to a single axis by testing that the amplitudes of the movement are greater than a given threshold.

Furthermore, said detection means, adapted for determining a rotation and/or a translation of said sensor assembly in relation to a single axis over a sliding time window, are adapted for applying a processing to said test output so as to improve the detection of single axis movement as a function of time.

Time-contradictory detections are avoided. It will be possible to carry out this post-processing in several different ways, such as for example by counting the occurrences of detection until a threshold is attained, or by a low-pass filtering or averaging of the outputs.

Furthermore, said detection means, adapted for applying said processing comprises the steps of:

applying a low-pass filtering to said output of tests;

comparing the output of the low-pass filtering with a minimum threshold; and detecting a rotation of said sensor assembly in relation to a single axis when the output of the low-pass filtering exceeds said minimum threshold at least once during the current activation of said adjustment means.

Thus, time-contradictory detections are avoided.

In one embodiment, said detection means are, furthermore, adapted for:

calculating, over said window, the statistical variance of the measurements, in relation to each axis of measurement of said first determination means; and testing, furthermore, whether each axial statistical variance is less than an axial maximum threshold.

In this embodiment, where a detection of rotation movement of substantially invariant axis is sought, it is advantageous to employ means for measuring the speeds of rotation of the grippable device. These means are for example gyrometric sensors with at least two measurement axes. To improve the detection of movement of substantially invariant axis of rotation, it may be beneficial to supplement the measurement device with accelerometric sensors. It will thus be possible to verify that the signals measured on the accelerometric axes of the sensor comply with the single-axis rotation movement.

For example, if the rotation movement is carried out in relation to a given axis, and if it is not expected that the user simultaneously carries out movements of translation of the grippable device, the signals of the axis of the accelerometric sensor corresponding to the axis of rotation must be almost zero, even when the center of rotation of the movement imparted to the grippable device does not coincide with the accelerometric sensor.

Therefore, in order to consolidate the single-axis detection, it is possible to verify that this assumption of absence of significant acceleration on the detected axis of rotation is true. It is possible to do so through a measurement of the variance of the acceleration signal on this axis and a test relative to a given threshold.

Thus, the single-axis detection is improved, by rendering it more specific by using the information arising from the accelerometer to improve the detection of rotation movement of substantially invariant axis, formed on the signals of the gyrometer.

Thus, false detections are limited.

There is also proposed, according to another aspect of the invention, a method of gestural control of a system (SYST), by using a grippable mobile control element (TC) and a movement sensor assembly (EC) adapted for measuring the movements of said mobile element, in which a rotation and/or translation of said mobile element in relation to a substantially invariant axis is detected (DET) over a time window, the value of at least one parameter of said system is adjusted (REG), and an activation/deactivation of said adjustment means is controlled (CMD) so as to activate said adjustment upon a detection of a rotation and/or translation of said mobile element in relation to an axis which is substantially invariant over a time window.

BRIEF DESCRIPTION OF THE DRAWINGS

The invention will be better understood on studying a few embodiments described by way of wholly non-limiting examples and illustrated by the appended drawings in which.

DETAILED DESCRIPTION OF THE PREFERRED EMBODIMENTS

In all the figures, elements having the same references are similar.

Figure 1:
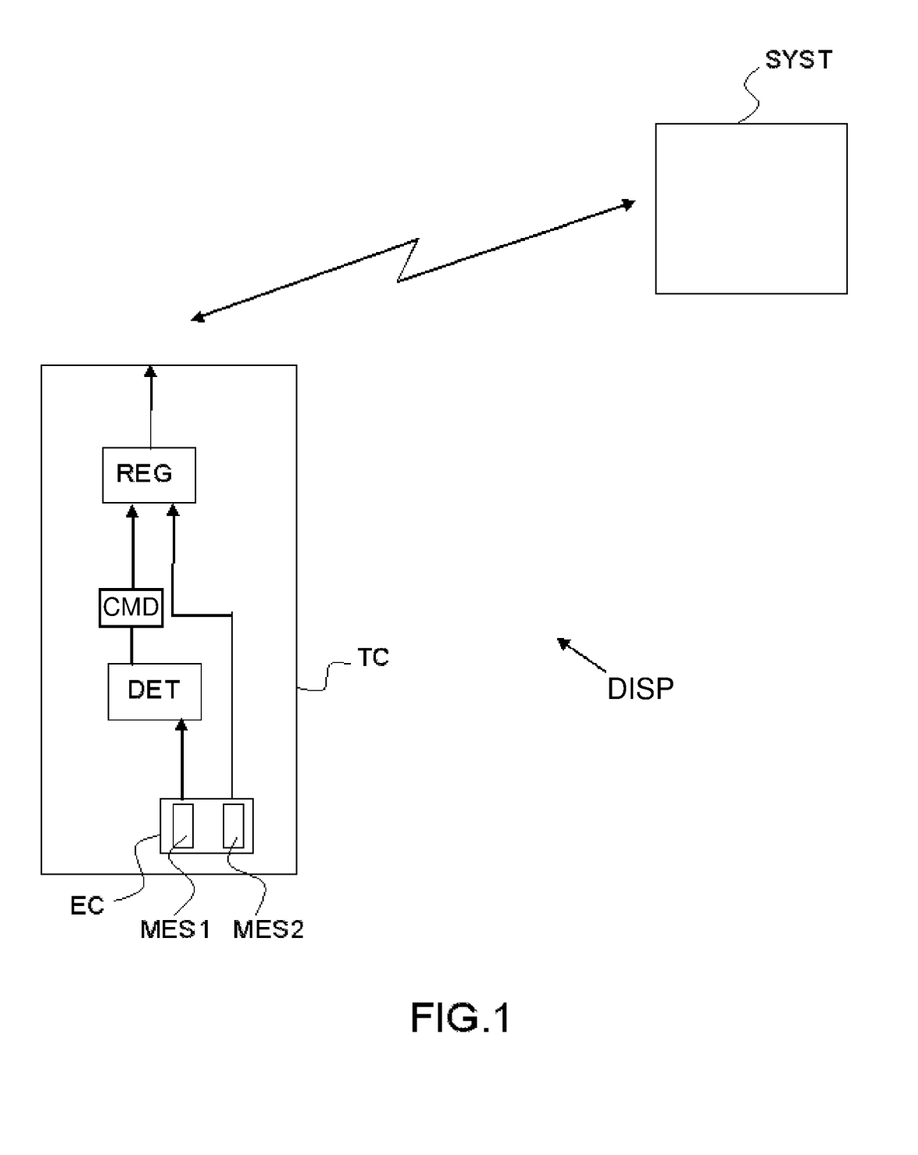
FIG. 1 schematically illustrates a device according to one aspect of the invention.

In FIG. 1 there is represented a device DISP for gestural control of a system SYST, for example a television TV connected to a decoder multimedia box BOX; the device DISP comprises a grippable mobile control element TC, for example a remote control, and a movement sensor assembly EC adapted for measuring the movements of said mobile element in relation to at least two axes.

The sensor assembly EC can be fastened to the grippable mobile control element TC or comprise a part secured to the mobile element TC and a fixed part in a fixed reference frame tied to the system, or else only a fixed part in a fixed reference frame tied to the system, such as a video sensor.

As a variant, the remote control element can be a mouse or a box that may be fixed on a user.

The device DISP comprises, furthermore, a detection module DET, which may be any suitable device such as a processor with related memory and program code, a special-purpose circuit, or the like, for detecting a rotation and/or translation of the mobile element in relation to an axis over a time window, possibly being a sliding window, comprising at least three instants of measurements of the sensor assembly EC. Furthermore, the device DISP comprises an adjustment module REG for adjusting the value of at least one parameter of the system, and a control module CMD for controlling activation/deactivation of the adjustment module REG adapted for activating the adjustment module REG during a detection by the detection module DET of a rotation and/or translation of the mobile element in relation to an axis. It will be appreciated that the adjustment module REG and control module CMD, like the detection module DET, may be provided by any suitable circuit, or may even be provided by the circuitry that forms the detection module DET.

The detection module DET can be adapted for determining the presence of a significant movement over the time window on the basis of a calculation of the value of a variable representative of said movement and of a comparison of said value with a threshold. Examples will be described further on.

Furthermore, the detection module DET can be capable of delivering as output values of parameters characterizing said detected axis of rotation and/or translation, for example by using a singular-value decomposition (SVD).

The control module CMD can be adapted for associating the adjustment module REG with at least one parameter of the system as a function of said values of parameters characterizing said detected axis of rotation and/or translation, and of defined values corresponding to at least one predefined axis of rotation and/or translation.

The detection module DET can be adapted for delivering as output a value of a parameter representative of an amplitude of the rotation and/or translation movement, and the control module CMD adapted for controlling an intensity of adjustment on the parameter(s) of the system SYST as a function of said amplitude or said amplitudes detected by the detection module DET.

The movement sensor assembly EC can comprise a first measurement module MES1 for measuring the angular positions, angular speeds of rotation, or angular accelerations in relation to said at least two axes of the movement sensor assembly EC.

Likewise or in combination, the movement sensor assembly EC can comprise a second measurement module MES2 for measuring the linear positions, linear speeds, or linear accelerations in relation to said at least two axes.

The detection module DET is adapted for detecting a rotation in relation to an axis on the basis of an average in relation to each axis of said at least two axes of the sensor assembly EC, and of a comparison of a function of these averages with a threshold.

Figure 2:
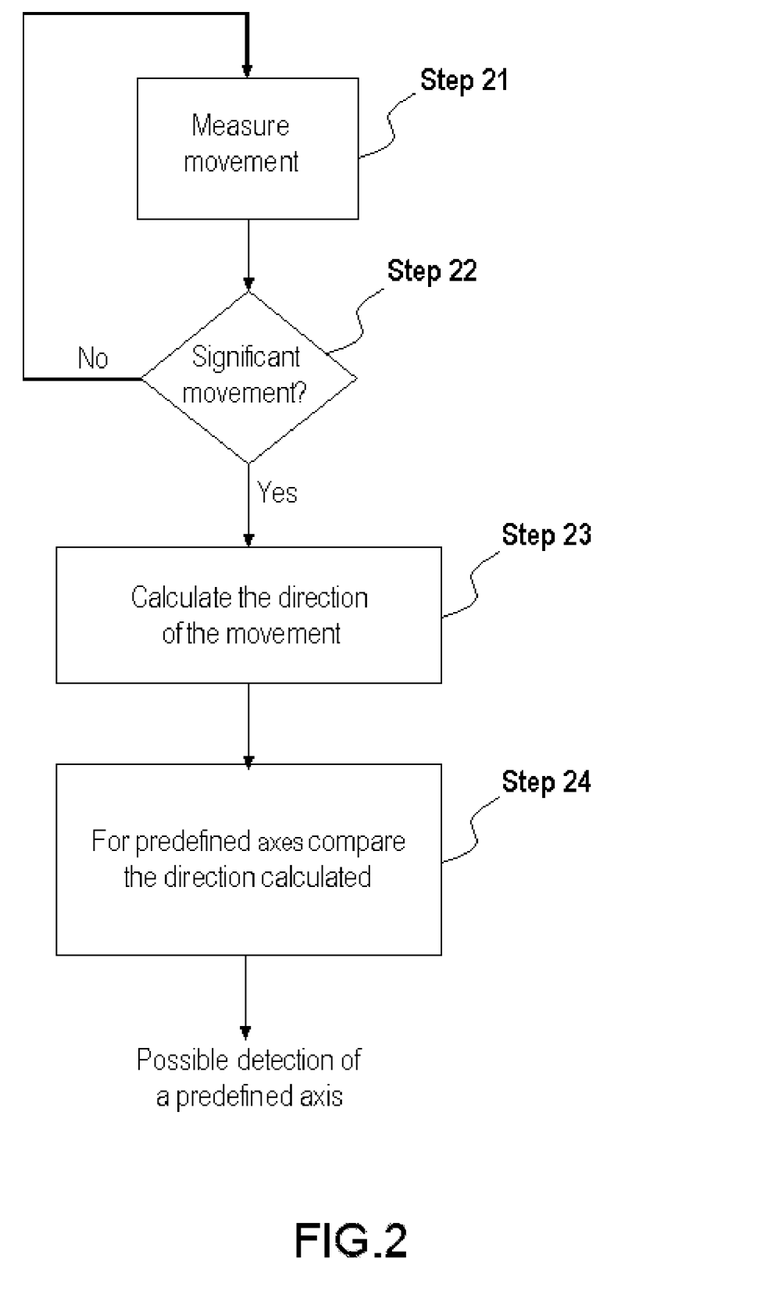
FIG. 2 schematically illustrates the steps of the operation of the method according to one aspect of the invention.

FIG. 2 schematically represents the steps of the operation of the method according to one aspect of the invention.

During a step 21, the sensor assembly EC provides measurements of the movement. The detection module DET tests, thereafter, in a step 22, whether there has been a significant movement, in which case, in a step 23, the detection module DET calculates the direction of the movement, and in an optional step 24, the detection module DET compares the direction calculated in step 23 with predefined axes, to detect whether it corresponds to one of them. As a variant, step 22 of detecting a significant movement can be done, for example, in parallel with steps 23 and 24.

Figure 3:
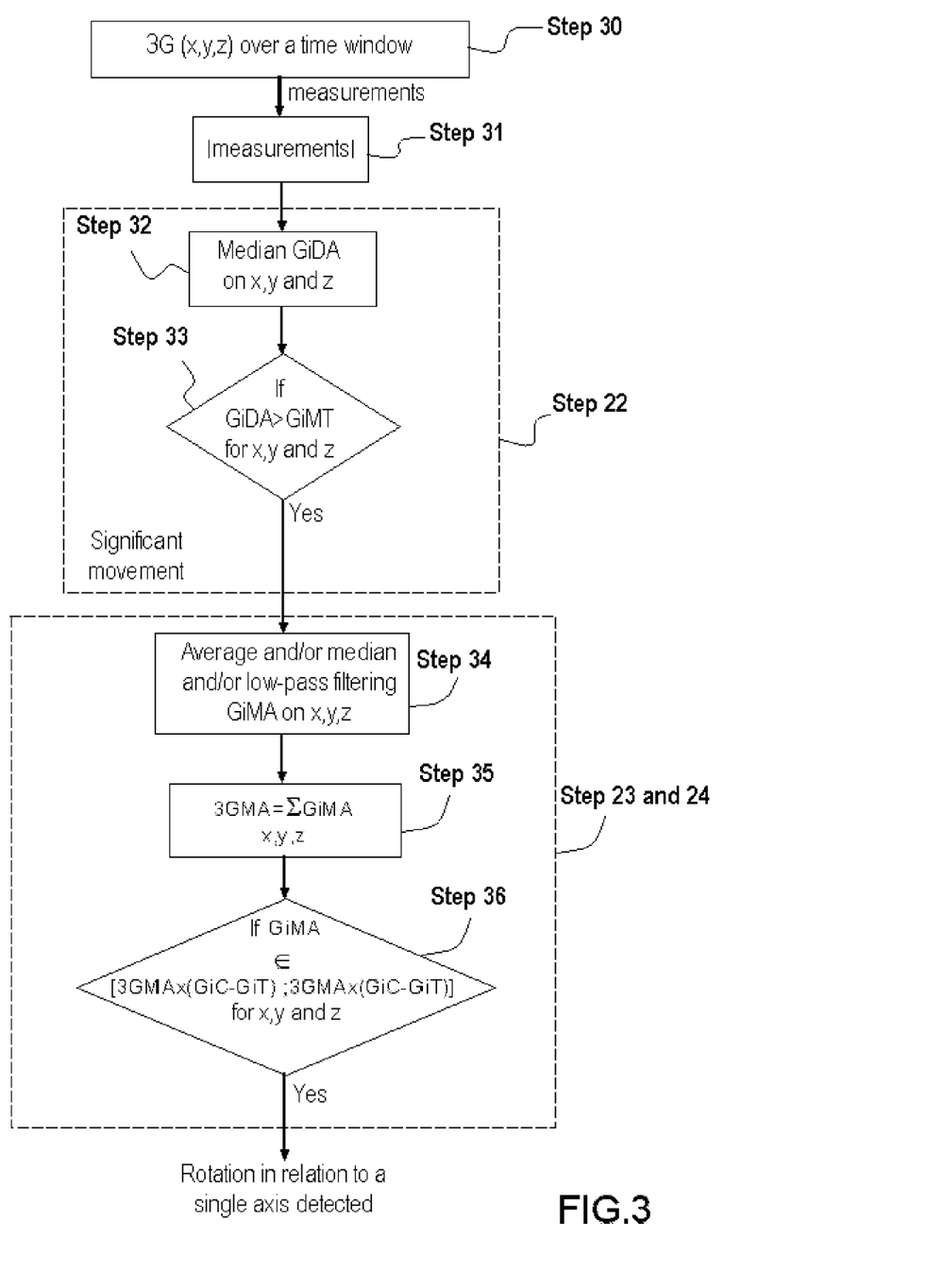
FIG. 3 schematically illustrates an exemplary method according to one aspect of the invention.

FIG. 3 schematically illustrates an exemplary embodiment of the method of FIG. 2.

In a step 30, a triaxial gyrometer 3G provides measurements over a time window, for example a sliding window.

An optional step 31 can be carried out comprising replacing the measurements provided by the triaxial gyrometer 3G with their respective absolute values.

Steps 32 and 33 carry out step 22 of FIG. 2; during step 32, a calculation of the median GiDA of the measurements or of the absolute value of the measurements in relation to each measurement axis x, y and z of the gyrometer 3G is performed. A test is thereafter performed, during a step 33, if, for each measurement axis x, y and z of the gyrometer 3G, the median GiDA is greater than an axial minimum threshold GiMT, which, should these conditions be realized, validates the detection of a significant movement and makes it possible to detect a rotation in relation to a single axis.

These optional steps 32 and 33, corresponding to the optional step 22 of FIG. 2, can be carried out, as a variant, in parallel in steps 34, 35 and 36 carrying out steps 23 and 24 of FIG. 2.

During step 34, a calculation of the average and/or median and/or a low-pass filtering in relation to each axis, of the angular speeds of rotation and/or of the linear speeds GiMA of the measurements or of the absolute value of the measurements in relation to each measurement axis x, y and z of the gyrometer 3G is performed. A calculation, during step 35, is thereafter performed, aimed at calculating the sum of the absolute values $$3GMA = \sum_i GiMA$$

of said axial averages GiMA on the three axes x, y and z.

Finally, during step 36, a test is performed, for each measurement axis x, y and z of the gyrometer 3G, testing whether the average and/or median and/or a low-pass filtering GiMA belongs to an interval of values [3GMA×(GiC−GiT); 3GMA×(GiC+GiT)] centered on a product 3GMA×GiC of the sum 3GMA of the GiMA values in relation to each measurement axis i and of the percentage GiC of contribution of GiMA in the sum 3GMA. The realization of these conditions validates the detection of a significant movement and makes it possible to detect a rotation in relation to a single axis.

In a more general manner, the detection module DET is adapted for detecting a rotation and/or a translation in relation to an axis which is substantially invariant over said time window on the basis of a calculation of a proportion of the amplitudes of the movements of each axis relative to the amplitude of the overall movement.

Stated otherwise, after calculation of the averages in the general sense of the term, i.e. comprising the medians, the averages, the low-pass filterings, the weighted averages etc., of the samples of the signal over the time window considered, on the various axes available, it is sought to establish the proportions of each of the axes in the overall movement. Starting from the step where these N averages of the signals are available (over the time window) on the N axes. Thereafter, to form these proportions, we calculate normed versions of the vector formed on these N averages in the general sense of the term.

For example, for N=2, denoting the axes by X and Y (example of a two-axis gyrometer, or of a sensor of translation speed in relation to two axes X and Y), we have an average Mx in relation to X and an Average My in relation to Y, and we form the vector V=(Mx, My).

We calculate these proportions by calculating: Mx/Norm (V) and My/Norm(V). It would be possible to say that we form the vector: V/Norm(V).

Any norm is suitable, for example:
the 1 norm which is equal to the sum of the absolute values: Abs(Mx)+Abs(My). We then have Mx/Norm (V) and My/Norm(V) which are numbers lying between −1 and 1.
the 2 norm, defined by: $Norm(V)=\sqrt{(M_X)^2+(M_Y)^2}$. Likewise, all the components of V/Norm (V) vary between −1 and 1.
the p norm, the infinite norm etc.

Figure 4:
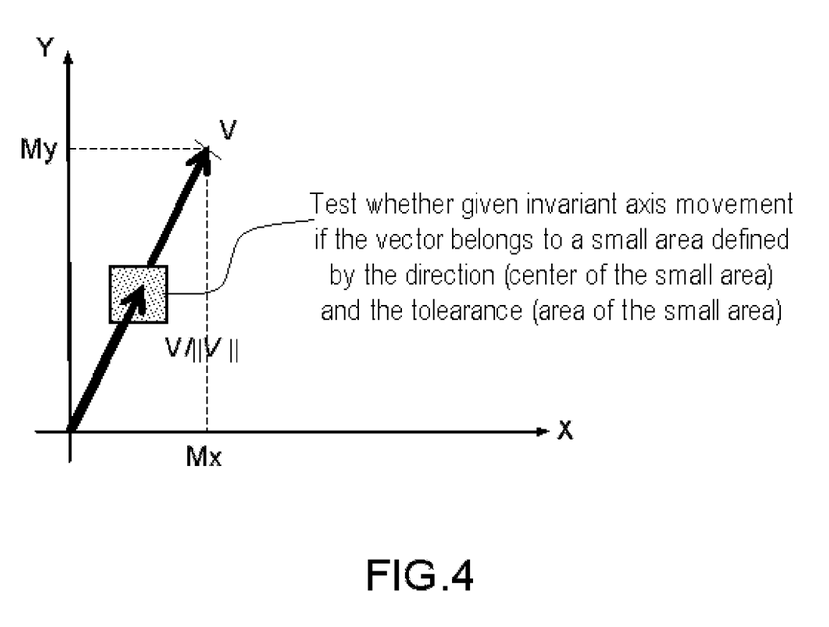
FIG. 4 illustrates a calculation of a proportion of the amplitudes of the movements of each axis relative to the amplitude of the overall movement, according to one aspect of the invention.

Thereafter, a test is carried out as to whether the end of the vector of proportions (in practice this vector of proportions may be the vector V/Norm(V)), belongs to a small area (or more generally, beyond dimension two, to a small volume) defined by the segments centered on the expected values. If the test is positive, it is deduced that the movement is of given substantially invariant axis. The two-dimensional example is illustrated in FIG. 4. It is easily possible to generalize to areas which would be roundels, ellipsoids, etc.

Figure 5A:
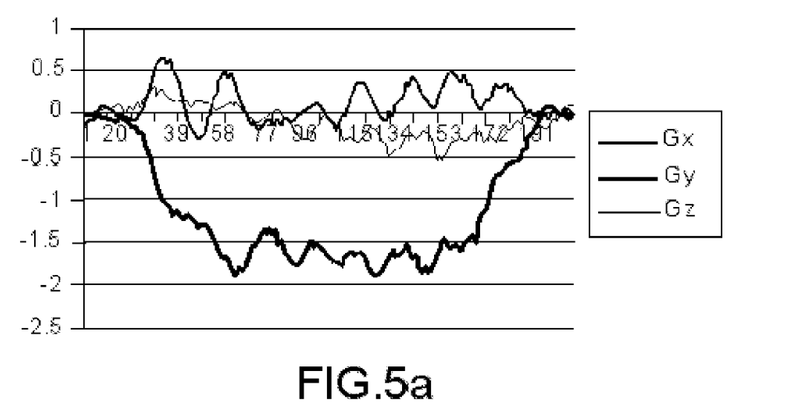
FIGS. 5a, 5b, 5c, 5d, 5e and 5f illustrate signals of the steps of the operation of the method according to one aspect of the invention.
Figure 5B:
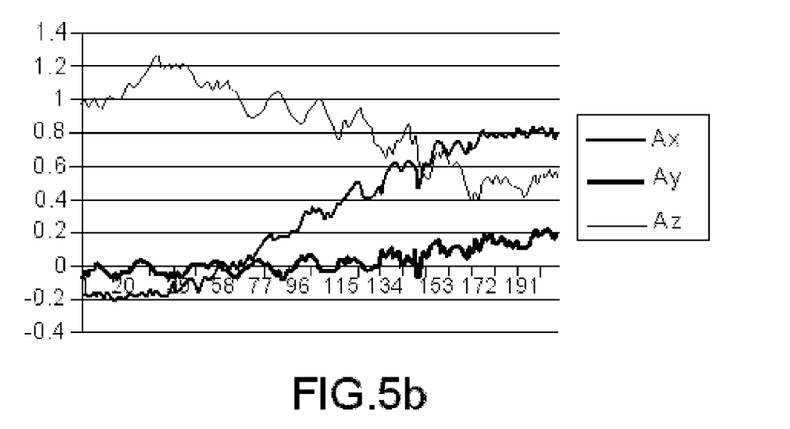

In one embodiment, the determination module DET for determining a rotation and/or translation of the sensor assembly EC in relation to a single axis is adapted for:
processing the data provided by the sensor assembly EC over a sliding window, for example of a duration of 200 ms, as illustrated in FIG. 5*a* representing the measurements in relation to the three axes x, y and z of the gyrometer 3G;
calculating, over said sliding window, the average GiMA of the absolute value of the measurements, in relation to each axis of the first measurement module MES1, for example in relation to each measurement axis i of a gyrometer;
calculating, over said sliding window, the sum $$3GMA = \sum_i GiMA$$

of said axial averages GiMA;
testing whether each axial average GiMA is greater than an axial minimum threshold GiMT, that may be identical for the various axes i, and whether each axial average GiMA belongs to a value interval [3GMA× (GiC−GiT); 3GMA×(GiC+GiT)] centered on a product 3GMA×GiC of the sum 3GMA of the averages GiMA in relation to each measurement axis i and of the percentage GiC of contribution of said axial average GiMA in said sum 3GMA;
delivering as output of tests, the value 1 if all said tests are positive, and the value 0 otherwise;
applying a low-pass filtering to said output of tests, for example a Butterworth filter of order 2, and of relative cutoff frequency 0.025;
comparing the output of the low-pass filtering with a minimum threshold S1min, that may for example lie between 0 and 1, such as 0.85; and
detecting a rotation of the sensor assembly EC in relation to a single axis when the output of the low-pass filtering exceeds the minimum threshold S1min at least once during the current activation of the regulating module REG.

Figure 5C:
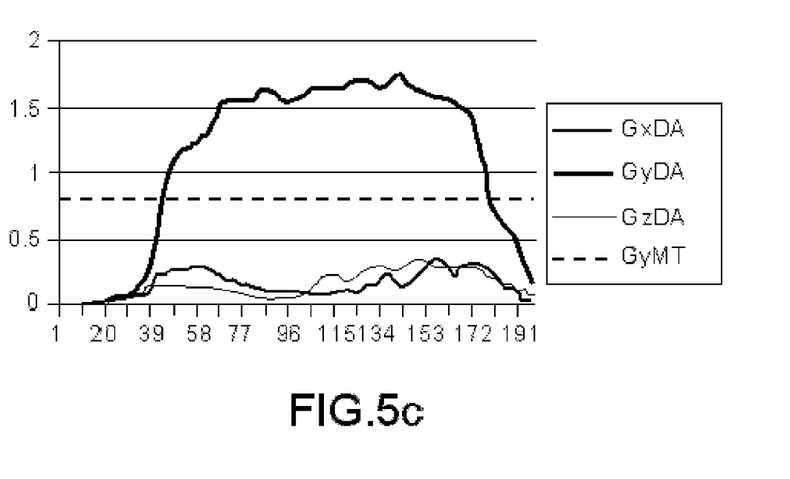
Figure 5D:
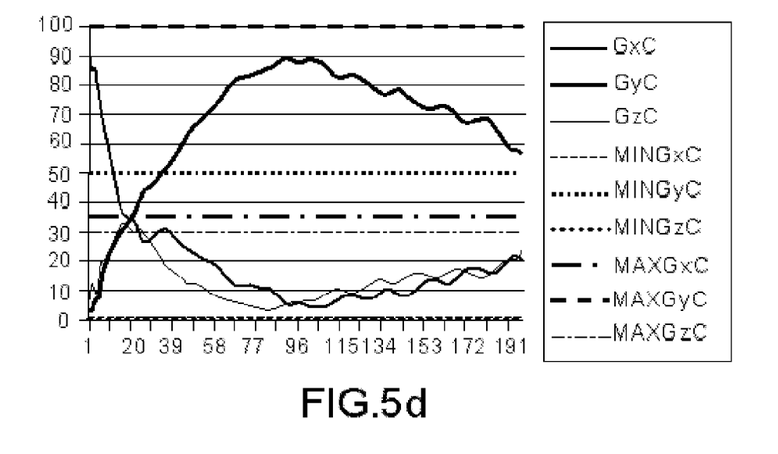
Figure 5E:
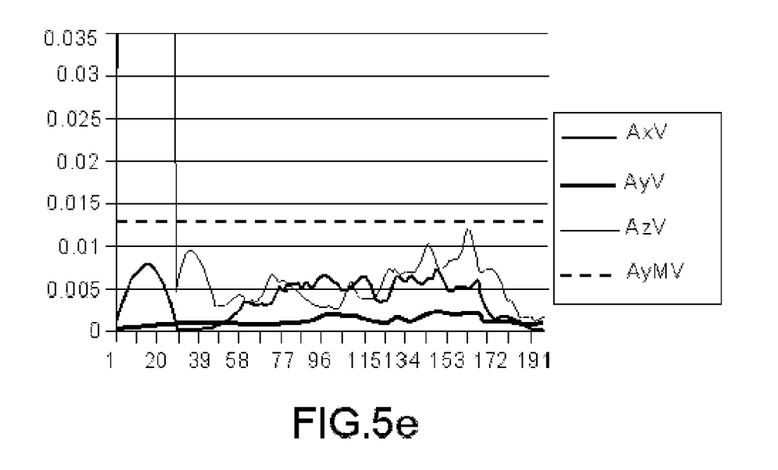
Figure 5F:
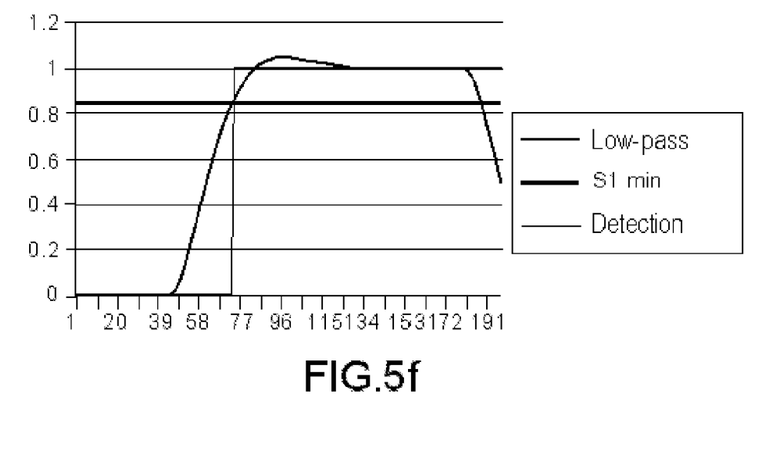

In another embodiment, the determination module DET for determining a rotation and/or translation of the sensor assembly EC in relation to a single axis is adapted for:
processing the data provided by the sensor assembly EC over a sliding window, for example of a duration of 200 ms, as illustrated in FIG. 5*a* representing the measurements in relation to the three axes x, y and z of the gyrometer 3G;
calculating, over said sliding window, the median GiDA of the absolute value of the measurements, in relation to each axis of the first measurement module MES1, for example in relation to each measurement axis i of a gyrometer, as illustrated in FIG. 5*c*;
calculating, over said sliding window, the average GiMA of the absolute value of the measurements, in relation to each measurement axis i of the gyrometer;
calculating, over said sliding window, the sum $$3GMA = \sum_i GiMA$$

of said axial averages GiMA, as illustrated in FIG. 5*d*;
testing whether each axial median GiDA is greater than an axial minimum threshold GiMT, that may be identical for the various axes i, as illustrated in FIG. 5*c*, and whether each axial average GiMA belongs to an interval of values [3GMA×(GiC−GiT); 3GMA×(GiC+ GiT)] centered on a product 3GMA×GiC of the sum 3GMA of the averages GiMA in relation to each measurement axis i and of the percentage GiC of contribution of said axial average GiMA in said sum 3GMA as illustrated in FIG. 5*d*, the MIN and MAX corresponding to the bounds of the respective intervals;
delivering as output of tests, the value 1 if all said tests are positive, and the value 0 otherwise;
applying a low-pass filtering to said output of tests, for example a Butterworth filter of order 2, and of relative cutoff frequency 0.025, as illustrated in FIG. 5*f*;
comparing the output of the low-pass filtering with a minimum threshold S1min, as illustrated in FIG. 4*f*; and
detecting a rotation and/or translation of said sensor assembly EC in relation to a single axis when the output of the low-pass filtering exceeds the minimum threshold S1min at least once during the current activation of the regulating module REG, as illustrated in FIG. 5*f*.

Figure 6A:
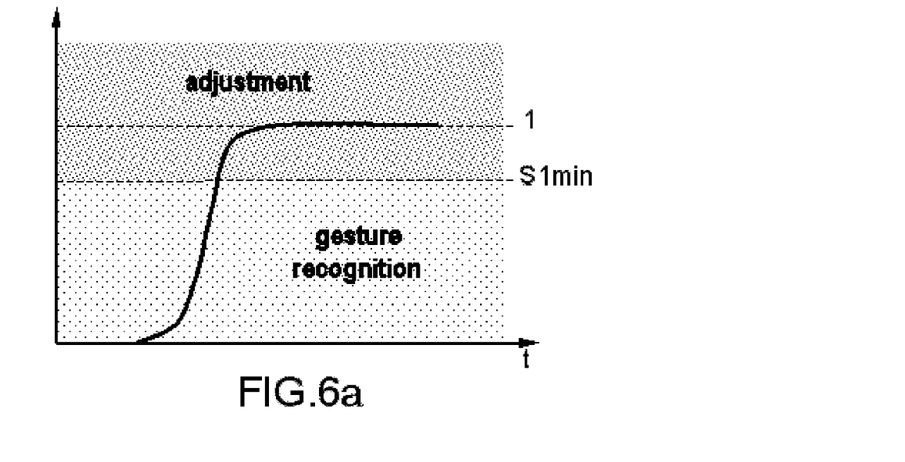
FIGS. 6a, 6b, 6c, 6d and 6e illustrate the detection of a rotation and/or translation of the mobile element in relation to a substantially invariant axis by comparing a parameter representative of the movement of the mobile element with a threshold, according to one aspect of the invention.

The minimum threshold S1min can be fixed, or, as a variant be adapted to the user so as to increase the performance of the device. FIG. 6*a* shows a functional version of FIG. 5*f*. The threshold S1min separates the zones which represent the various modes (adjustment and recognition of gestures). If the signal curve crosses the threshold, the device enters adjustment mode. This is the case for FIG. 6a.

Figure 6B:
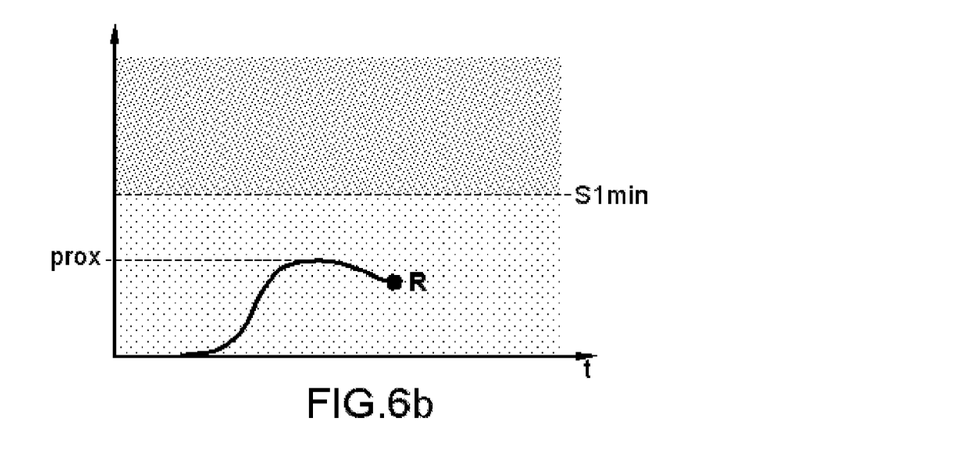

FIG. 6b shows a curve on which the signal remains below the minimum threshold S1min. The point R at the end of the curve represents the moment at which the user releases the button at the end of the movement thereof. The value Prox is defined as the maximum of the curve and represents the proximity of the curve to the minimum threshold S1min. In this example, the value Prox is about 50% of the value of the minimum threshold S1min, which is the desired and optimal region. As the signal does not pass above the minimum threshold S1min, the device enters the gesture recognition mode and compares the user's gesture with the library of gestures.

Figure 6C:
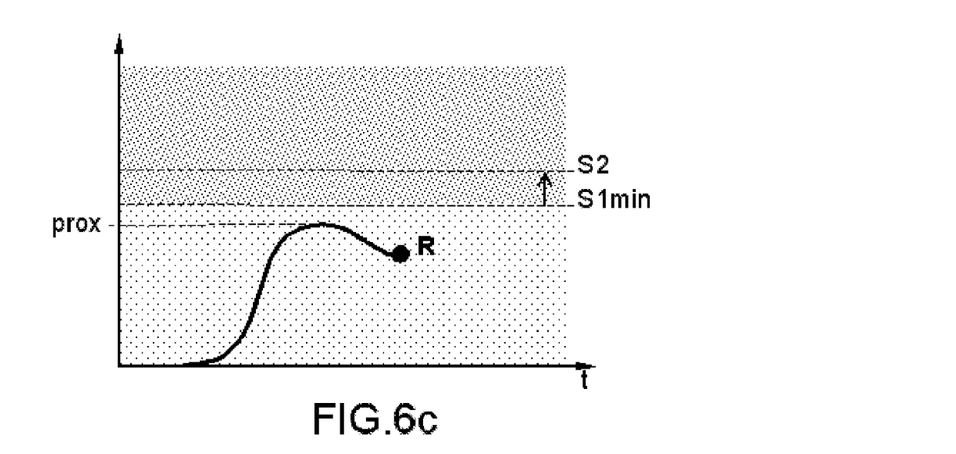

FIG. 6c illustrates the case in which the signal remains also less than the minimum threshold S1min, but approaches it. The value Prox is close to 100% of the minimum threshold value S1min. Once again, the device enters the gesture recognition mode and compares the user's gesture with the gestures of the library of gestures. However, the proximity of the curve and of the minimum threshold S1min signifies that there exists a high probability of a false detection; that is to say the device may enter the adjustment mode, while the desired mode is the gesture recognition mode. To decrease the probability of a false detection, the minimum threshold S1min can be increased to a value S2, so that the value Prox is close to 50% of the new threshold value S2.

Figure 6D:
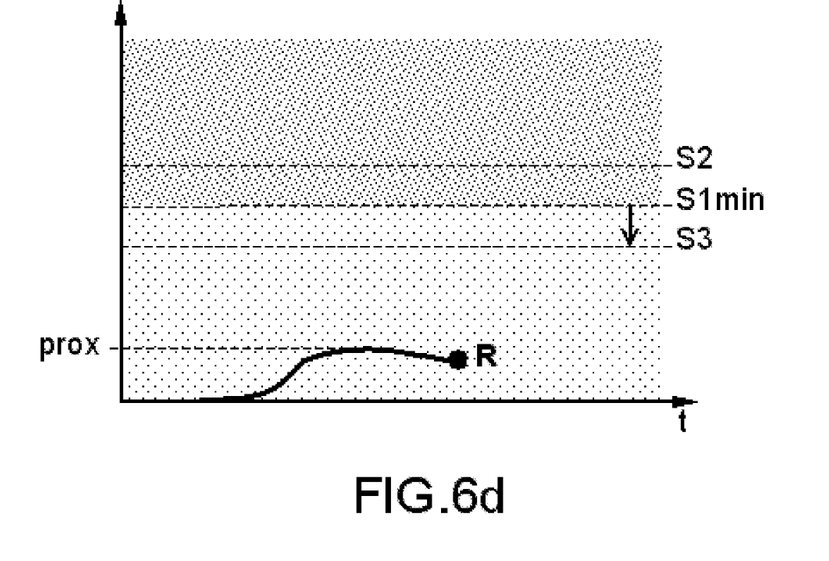

FIG. 6d illustrates the situation inverse to that of FIG. 6c. In this case, the signal does indeed remain below the thresholds S1min and S2 and the value Prox is very low. This signifies that the minimum threshold S1min is probably adjusted to too big a value. Consequently, it is possible that the user may perform a movement because he wishes to enter the adjustment mode, but that the minimum threshold S1min is too high for it to be attained easily. Thus, the curve representing the signal does not in fact exceed the threshold and the device uses the gesture recognition mode and not the adjustment mode desired. To solve this problem the minimum threshold S1min is decreased to a value S3, such that the value Prox again approaches 50% of the new threshold value S3.

The adaptation of the threshold, as indicated in FIGS. 6c and 6d, can be done as soon as a one-off event occurs for which the value Prox is too high or too low. Otherwise, the device can also adapt the minimum threshold S1min only after several potentially problematic events. The amount of change applied to the threshold can be adjusted to obtain the desired responsiveness of the device.

Figure 6E:
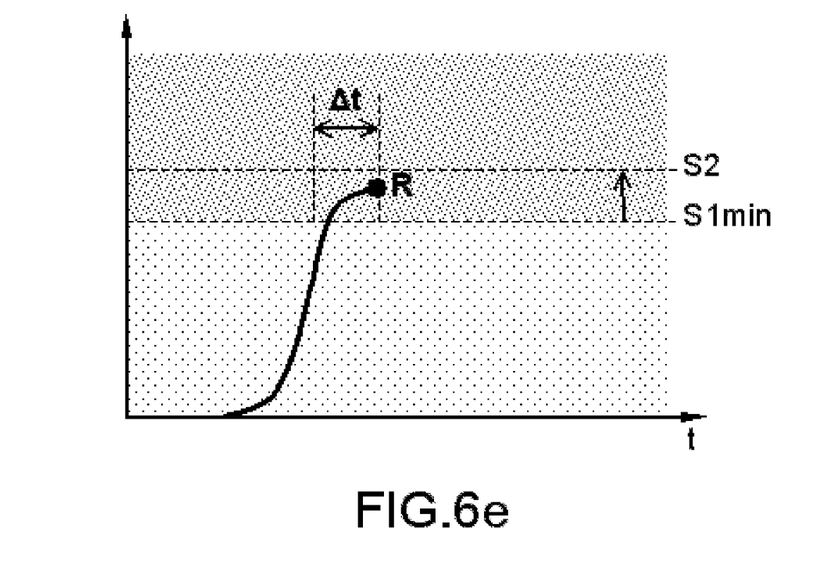
Figure 7:
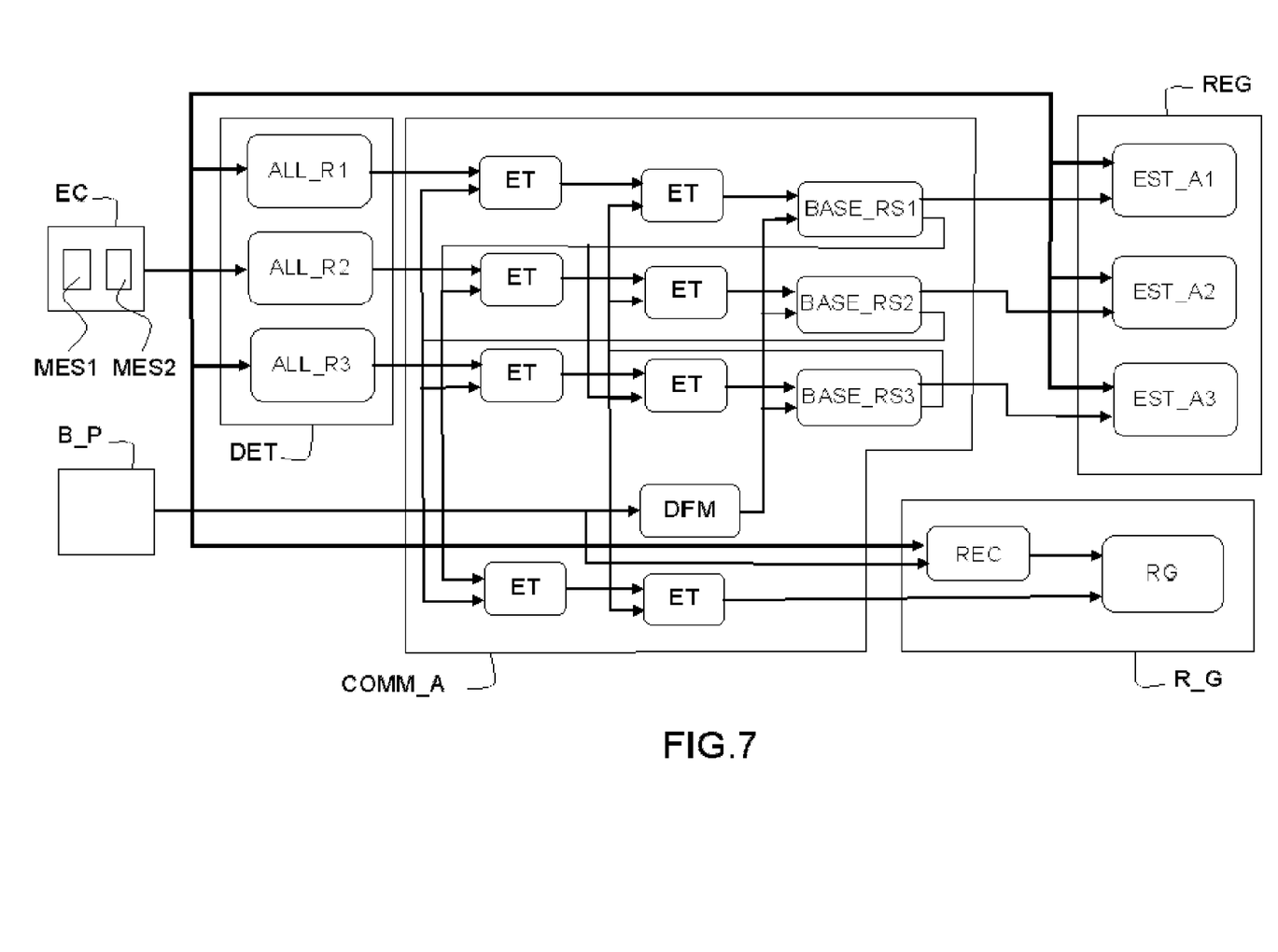
FIG. 7 schematically illustrates an exemplary embodiment of a device according to one aspect of the invention, in which the determination module can detect rotations in relation to predetermined axes.

FIG. 6e illustrates another situation in which the minimum threshold S1min is adapted for increasing the rate of appropriate detections of the device. In this case, the curve of the signal transmitted exceeds the minimum threshold S1min. Consequently, the device enters the adjustment mode, and the user is prompted with a visual feedback. Now, in this situation, it is assumed that the user's intention was to activate a gesture recognition function. As soon as the user sees the visual feedback, he releases the button (at the moment R) to terminate his gesture since the user realizes that he has entered the adjustment mode although this was not his intention. Thus, this event represents a false detection of the adjustment mode. As the user has released the button rapidly, the duration Δt of the adjustment mode is fairly short (about 500 ms). By virtue of a test on this duration, it is possible for the system to validate with a high probability, whether the decision to enter adjustment mode constitutes a false detection. Erroneous executions of the control mode are detected by comparing the duration Δt with a time lag threshold. If the duration is less than the time lag threshold, the threshold for detecting the user's intention, between adjustment or gesture, will be adapted. In this case threshold S1min is too low, and the device increases the threshold from S1min to S2 to avoid future false detections.

As in the situations of FIGS. 6c and 6d, the adaptation of the threshold can be done as soon as a one-off event occurs or only after multiple false detections.

Furthermore, for the two embodiments which have just been described, the second measurement module MES2 of the movement sensor assembly EC can comprise an accelerometer with at least two measurement axes. In the example described, the accelerometer has three measurement axes.

In this case, the determination module DET for determining a rotation and/or translation of the sensor assembly EC in relation to a single axis, is, furthermore, adapted for:
  calculating, over the sliding window, the statistical variance AiV of the measurements, in relation to each measurement axis i of the accelerometer; and
  testing, furthermore, whether each axial statistical variance AiV is less than an axial maximum threshold AiMV, that may, for example, be identical on each axis.

These additional tests make it possible to improve the accuracy of the device.

The determination module DET is adapted for detecting at least one rotation and/or translation of the sensor assembly EC in relation to at least one defined axis.

Thus, it is possible to detect only rotations and/or translations relative to predetermined axes, and to limit the amount of data to be processed as output from the determination module DET.

In the whole assembly of the possible embodiments, the sensor assembly EC is disposed in the control element, but the determination module DET, the control module CMD, and the adjustment module REG may be disposed outside the grippable mobile control element TC, in an element interfaced with the system SYST, such as a multimedia decoder, or directly in the system SYST.

The invention claimed is:

1. A device for gestural control of a system, the device comprising:
  a grippable mobile control element,
  a movement sensor assembly configured to measure movements of said mobile control element,
  a detection module configured to detect a rotation or a translation of said mobile control element in relation to an axis that is substantially invariant over a time window, said rotation or said translation of said mobile control element including a first phase and a second phase,
  an adjustment module configured to adjust a value of at least one parameter of said system during said second phase of said rotation or said translation, and
  a control module configured to activate during said first phase said adjustment module upon said detection module detecting said rotation or said translation of said mobile control element is in relation to an axis that is substantially invariant over a time window.

2. The device as claimed in claim 1, wherein the detection module is configured to detect a rotation or a translation of said mobile control element is in relation to a substantially invariant axis by comparing a parameter representative of the movement of said mobile control element with a threshold.

3. The device as claimed in claim 2, wherein said control module is configured to activate a module different from said adjustment module in the absence of detection by said detection module of a rotation or a translation of said mobile control element in relation to an axis which is substantially invariant over a time window.

4. The device as claimed in claim 3, wherein said module different from said adjustment module comprises a gesture recognition mode.

5. The device as claimed in claim 4, wherein said detection module is configured to modify said threshold after at least one gesture has triggered the gesture recognition mode, for which a maximum value of said representative parameter is not included in a span of percentages of values of said threshold.

6. The device as claimed in claim 2, wherein said detection module is configured to modify said threshold after detection of at least one gesture having activated the adjustment module, a duration of activation of the adjustment module being less than a limit duration.

7. The device as claimed in claim 1, wherein said time window is a sliding window.

8. The device as claimed in claim 1, wherein said detection module is configured to determine the presence of a significant movement over said time window on the basis of a calculation of a value of a variable representative of said movement and of a comparison of said value with a threshold.

9. The device as claimed in claim 1, wherein said detection module is configured to deliver as output values of parameters characterizing said detected axis of rotation or translation.

10. The device as claimed in claim 9, wherein said detection module is configured to use singular-value decomposition.

11. The device as claimed in claim 9, wherein said control module is configured to associate the adjustment module with at least one parameter of the system during said second phase of said rotation or said translation as a function of said values of parameters characterizing said detected axis of rotation or translation, and of defined values corresponding to at least one predefined axis of rotation or translation.

12. The device as claimed in claim 11, wherein:
said detection module is further configured to deliver as output a value of a parameter representative of an amplitude of the rotation or translation movement in relation to the detected axis, and
said control module is further configured to control an intensity of adjustment on the at least one parameter of the system as a function of said amplitude or said amplitudes detected by said detection module.

13. The device as claimed in claim 1, wherein said movement sensor assembly comprises a sensor to measure angular positions, angular speeds of rotation, or angular accelerations in relation to at least two axes.

14. The device as claimed in claim 1, wherein said movement sensor assembly comprises a sensor to measure linear positions, linear speeds, or linear accelerations in relation to at least two axes.

15. The device as claimed in claim 1, wherein said detection module is configured to use absolute values of data provided by said movement sensor assembly in place of said data provided by said movement sensor assembly.

16. The device as claimed in claim 1, wherein said detection module is configured to detect a rotation or a translation in relation to an axis that is substantially invariant over said time window on the basis of a calculation of a proportion of amplitudes of movements of each axis relative to an amplitude of overall movement.

17. The device as claimed in claim 16, wherein said detection module is configured to detect a rotation or a translation in relation to an axis utilizing an average or a median in relation to each axis of the sensor assembly, and a comparison of a function of said average or median with an interval of values.

18. The device as claimed in claim 8, wherein said detection module is further configured to:
calculate, over said time window, an average or a median or a low-pass filtering in relation to each axis, of angular speeds of rotation or of linear speeds;
calculate, over said window, a sum of absolute values of axial averages;
calculate proportions by a ratio between the axial averages and said sum of the absolute values of the axial averages; and
deliver as output of tests, a first value if all said tests are positive, and a second value, different from the first value, otherwise.

19. The device as claimed in claim 18, wherein said detection module is further configured to test whether each axial average is greater than an axial minimum threshold, and whether each axial average belongs to a value interval dependent on the detected axis.

20. The device as claimed in claims 18, wherein said detection module is further configured to process said test results so as to improve detection of single axis movement as a function of time.

21. The device as claimed in claim 20, wherein said processing of said test result comprises:
applying a low-pass filtering to said test results;
comparing output of the low-pass filtering with a minimum threshold; and
detecting a rotation of said sensor assembly in relation to a single axis when the output of the low-pass filtering exceeds said minimum threshold at least once during a current activation of said adjustment module.

22. The device as claimed in claim 8, wherein said detection module is further configured to:
calculate, over said time window, a statistical variance of measurements, in relation to each axis of measurement of said movement sensor; and
test whether each axial statistical variance is less than an axial maximum threshold.

23. A method of gestural control for a system comprising a grippable mobile control element and a movement sensor assembly adapted for measuring movements of said mobile control element, the method comprising:
detecting, over a time window, a rotation or a translation of said mobile control element in relation to a substantially invariant axis, said rotation or said translation of said mobile control element including a first phase and a second phase;
adjusting a value of at least one parameter of said system during said second phase, and
controlling activation of said adjustment so as to activate during said first phase said adjustment upon a detection of said rotation or said translation of said mobile control element being in relation to an axis which is substantially invariant over the time window.

* * * * *